US007879936B2

(12) United States Patent
Woodhall et al.

(10) Patent No.: US 7,879,936 B2
(45) Date of Patent: Feb. 1, 2011

(54) PROTECTIVE MASKING SOLUTIONS COMPRISING THIXOTROPIC FILM FORMERS

(75) Inventors: Edward W. Woodhall, Los Altos, CA (US); Robert Louis Mesa, Santa Clara, CA (US)

(73) Assignee: Cal-West Speciality Coatings, Inc., Sunnyvale, CA (US)

( * ) Notice: Subject to any disclaimer, the term of this patent is extended or adjusted under 35 U.S.C. 154(b) by 0 days.

(21) Appl. No.: 12/501,294

(22) Filed: Jul. 10, 2009

(65) Prior Publication Data

US 2010/0009215 A1 Jan. 14, 2010

Related U.S. Application Data

(63) Continuation of application No. 10/857,180, filed on May 28, 2004, now abandoned.

(60) Provisional application No. 60/474,720, filed on May 30, 2003.

(51) Int. Cl.
*B05D 1/32* (2006.01)
*C09D 5/00* (2006.01)
*C09D 123/08* (2006.01)
*C09D 153/00* (2006.01)

(52) U.S. Cl. ....................... 524/391; 524/401; 524/423; 524/438; 524/599

(58) Field of Classification Search ................. 524/391, 524/401, 423, 438, 599
See application file for complete search history.

(56) References Cited

U.S. PATENT DOCUMENTS 6,117,485 A * 9/2000 Woodhall et al. ........... 427/156
2005/0020722 A1* 1/2005 Woodhall et al. ........... 523/122

* cited by examiner

*Primary Examiner*—David M Brunsman
(74) *Attorney, Agent, or Firm*—Weaver Austin Villeneuve & Sampson LLP; Tom Hunter

(57) ABSTRACT

This invention provides a masking material that can be used to protect an underling surface (e.g., an automobile surface) during an overcoating (e.g., painting) operation. The masking material in one embodiment includes a thickener and a pH control agent and water. The masking material can be applied to a surface that is to be protected from paint overspray or other coating processes, allowed to dry, and the surface then coated (e.g., with paint). After drying of the paint, or other coating, the masking material can removed by water washing.

38 Claims, 1 Drawing Sheet

| Component | Illustrative Commercial Form | Percent Active Ingredient in Component (%AI) | Percent of Component in Masking Composition | % AI in Masking Composition | Minimum (%) | Maximum (%) |
|---|---|---|---|---|---|---|
| Thickener/ Film Former | Carbopol EP-1 BF Goodrich | 30 | 4 | 1.2 | 0.5 | 10 |
| Humectant | Polyethylene Glycol 400 | 100 | 0.1 | 0.1 | 0 | 5 |
| Flash Corrosion Inhibitor | Ammonium Benzoate | 100 | 0.010 | 0.010 | 0 | 0.5 |
| Viscosity Control | Sodium Sulfate | 100 | 0.1 | 0.1 | 0 | 2 |
| pH control | Sodium Hydroxide | 100 | 0.175 | 0.175 | 0.02 | 0.5 |
| Surfactant Primary | Tomadol 91-6 Tomah | 100 | 0.250 | 0.250 | 0 | 5 |
| Surfactant Secondary | Triton DF-16 Union Carbide | 100 | 0.025 | 0.025 | 0 | 5 |
| Wetting agent /biocide | Ethyl Alcohol | 95 | 0.375 | 0.36 | 0 | 20 |
| Biocide | Kathon LX 14 Rohm & Haas | 14 | 0.019 | 0.003 | 0 | 0.01 |
| Dye/Coloring | Uranine Abbey | 75 | 0.010 | 0.0075 | 0 | 0.02 |
| Water. | Deionized | 100 | remainder | remainder | remainder | remainder |

Fig. 1

PROTECTIVE MASKING SOLUTIONS COMPRISING THIXOTROPIC FILM FORMERS

CROSS-REFERENCE TO RELATED APPLICATIONS

This application is a continuation of U.S. Ser. No. 10/857,180, filed May 28, 2004, now abandoned, which claims benefit of and priority to U.S. Ser. No. 60/474,720, filed on May 30, 2003 which is incorporated herein by reference in its entirety for all purposes.

STATEMENT AS TO RIGHTS TO INVENTIONS MADE UNDER FEDERALLY SPONSORED RESEARCH AND DEVELOPMENT

[Not Applicable]

FIELD OF THE INVENTION

The present invention relates to the field of protective coatings to be used during coating operations of various surfaces including surfaces of vehicles or buildings. In certain embodiments the invention provides an improved method and composition for masking selected portions of a surface, in particular a painted vehicle surface, from paint or other overcoating materials.

BACKGROUND OF THE INVENTION

It is well known that painting, or other overcoating operations often require masking of certain portions of the surface of the object to be painted to prevent overspray by the coating material (e.g., paint). For example, it is often necessary to mask trim, and/or windows, and/or certain already painted areas on a vehicle (e.g., a motor vehicle) or a component of a vehicle (e.g., a door, a bumper, a frame, etc.) from paint overspray.

Similarly, when painting building components (e.g., window frames) it is often desirable to protect certain areas (e.g., the glass windows) of the building components from paint overspray.

On occasion, it is necessary to mask painted portions of a vehicle or building from paints of a different color and overspray of paints of the same color. In addition, it is often desired to protect the surfaces (e.g., floors or walls) of the area (e.g., paint spray booth) in which the overcoating (e.g., painting) operation is performed.

In practice, masking operations are often one of the most time consuming and, therefore, expensive parts of the painting/overcoating process. In spite of attempts to develop suitable chemical masks for vehicle painting, vehicle painters continue to use primarily masking tape and paper to cover portions of a vehicle where paint is not desired. To mask the trim on a car, for example, will often require many hours of tedious labor. Furthermore, even when done carefully, defects in such paint masks allow paint to contact surfaces that are desired to be protected.

Chemical masking solutions have been proposed to the problem of protecting surfaces during coating processing operations. However, such techniques have often not found extensive use. Some of the proposed chemical masks have been unsuitable for application to portions of a vehicle or building because of damage that could potentially occur to the protected portions of the vehicle or building. Other compositions are not water-soluble which increases the difficulty and expense of removal. In addition, masks that require solvents for removal are problematic in view of the increasing regulation of disposal of solvents as environmental regulation becomes stricter with time. Other compositions are difficult to apply, difficult to remove, excessively costly, or the like.

From the above it is seen that an improved masking that is easily applied and removed, that provides good surface protection, that is economical, and whose use entails little or no environmental impact is needed.

SUMMARY OF THE INVENTION

The present invention provides improved methods and compositions for protecting a s vehicle (e.g., motor vehicle) or other surface subject to a coating operation such as painting, or for protecting a surface of an article manufacture during an assembly operation. In certain embodiments, the compositions comprise a thickener and a pH control agent.

In one embodiment, this invention provides a method of temporarily protecting a surface in a coating (e.g., painting) operation. The method typically involves applying a masking material to the surface (e.g., the surface of a vehicle), the masking material, before drying, comprising an aqueous solution of: a thixotropic thickener present in an amount ranging from about 0.15 to about 5 weight percent active ingredient and a pH control to adjust pH of the masking material from about pH 7.5 to about pH 9.5; coating all or a portion of the surface with an overcoating compound (e.g., paint) where the masking material prevents the coating compound from contacting the surface covered with the masking composition; and c) removing the masking material from the surface whereby the coating compound applied to the surface covered with the masking material is removed together with the masking material. In certain embodiments, the coating is performed before the masking material is dried, while in certain other embodiments, the coating is performed after the masking material is dried. In certain embodiments, the surface is a painted surface of an automobile and/or a bumper or trim of a vehicle. In certain embodiments, the thixotropic thickener is a thickener selected from the group consisting of Carbopol™ EP-1, and Albucril ESP. In various embodiments, the pH control comprises a base (e.g., sodium hydroxide, potassium hydroxide, magnesium hydroxide, an amine, sodium bicarbonate, etc.). The masking material can, optionally, further comprise a surfactant. The surfactant when present, it typically present in an amount effective to produce a coating that lays out smoothly in a substantially continuous film of the painted surface of an automobile. In various embodiments surfactant is present at less than about 1 weight percent active ingredient of the masking material. In various embodiments the surfactant comprises a non-ionic surfactant (e.g., an alcohol ethoxylate). In certain embodiments, the surfactant comprises TOMADOL™ 91-6 and/or TRITON™ DF-16. The masking material can, optionally, further comprise a viscosity control. Suitable viscosity controls include, but are not limited to various salts (e.g. sodium sulfate). In various embodiments the viscosity control ranges up to about 2.0 weight percent active ingredient of the masking material. The masking material can, optionally, further comprise an alcohol (e.g. a straight chain alcohol). In various embodiments the alcohol, when present, is ethanol, methanol, and/or propanol. In various embodiments the alcohol is present in a concentration ranging up to about 20 weight percent active ingredient of the masking material. The composition can also, optionally, further comprise a biocide (e.g. Kathon LX 14) and/or a humectant (e.g. polyethylene glycol). In certain embodiments, the biocide ranges up to about 0.2 weight percent active ingredient of the masking material. The composition can also, optionally, further comprise a flash corrosion inhibitor (e.g., ammonium benzoate). In various embodiments the flash corrosion inhibitor comprises up to about 0.01 weight percent active ingredient of the masking material.

In certain preferred embodiments, the masking material further comprises: a surfactant; a flash corrosion inhibitor; a viscosity control; an alcohol; and a humectant. In various embodiments the thixotropic thickener ranges from about 0.1 to about 10 weight percent active ingredient of the masking material; the pH control is sufficient to set the pH of the masking about pH7.5 to about pH 9.5; the surfactant comprises less than about 1 weight percent active ingredient of the masking material; the flash corrosion inhibitor comprises from about 0 to about 0.2 weight percent active ingredient of the masking material; the viscosity control comprises a salt ranging from about 0 to about 2 weight percent active ingredient of the masking material; the alcohol comprises from about 0 to about 20 weight percent active ingredient of the masking material; and the humectant comprises from about 0 to about 5 weight percent active ingredient of the masking material. In one embodiment, the thixotropic thickener is EP-1; the pH control is sodium hydroxide; the surfactant is a nonanionic surfactant; the flash corrosion inhibitor is ammonium benzoate; the viscosity control agent is sodium sulfate; the alcohol is ethanol; and the humectant is polyethylene glycol. In certain embodiments, the thixotropic thickener ranges from about 1 to about 2 weight percent active ingredient of the masking material; the pH control is sufficient to set the pH of the masking about pH 8.5 to about pH 9.5; the surfactant comprises less than about 0.5 weight percent active ingredient of the masking material; the flash corrosion inhibitor comprises less than about 0.01 weight percent active ingredient of the masking material; the viscosity control comprises less than about 0.15 weight percent active ingredient of the masking material; the alcohol comprises less than about 0.4 weight percent active ingredient of the masking material; and the humectant comprises less than about 0.15 weight percent active ingredient of the masking material.

This invention also provides a masking composition for the temporary protection of a surface during a coating procedure. The masking composition typically comprises an aqueous solution of: a thixotropic thickener present in an amount ranging from about 0.15 to about 5 weight percent active ingredient of the masking composition; and a pH control to adjust pH of the masking composition from about pH 7.5 to about pH 9.5. In certain embodiments, the thixotropic thickener is a thickener selected from the group consisting of CARBOPOL™ EPI, and Albucril ESP. In certain embodiments, the pH control comprises a base (e.g., sodium hydroxide, potassium hydroxide, magnesium hydroxide, an amine, sodium bicarbonate, etc.). In various embodiments the masking composition further comprises a surfactant (e.g., a surfactant present in an amount effective to produce a coating that lays out smoothly in a substantially continuous film of the painted surface of an automobile). In various embodiments, the surfactant is present at less than about 1 weight percent active ingredient of the masking material. In various embodiments the surfactant comprises a non-ionic surfactant (e.g. alcohol ethoxylate). In one embodiment, the surfactant comprises TOMADOL™ 91-6 and/or TRITON™ DF-16. The masking composition can optionally further comprise a viscosity control (e.g., a salt such as sodium sulfate). In various embodiments the viscosity control ranges up to about 2.0 weight percent active ingredient of the masking composition. In certain embodiments, the masking composition further comprises an alcohol (e.g., a straight chain alcohol such as ethanol, methanol, and/or propanol). In various embodiments the alcohol can be present in a concentration ranging up to about 20 weight percent active ingredient of the masking material. A biocide (e.g., Kathon LX 14) can also be included in the composition. In certain embodiments, the biocide ranges up to about 0.2 weight percent active ingredient of the masking composition. In certain embodiments, the masking composition further comprises a humectant (e.g., polyethylene glycol). In certain embodiments, humectant ranges up to about 5 weight percent active ingredient of the masking composition. In certain embodiments, the masking composition further comprises a flash corrosion inhibitor (e.g. ammonium benzoate). In various embodiments the flash corrosion inhibitor comprises up to about 0.01 weight percent active ingredient of the masking composition. In certain embodiments, the masking material comprises: a thixotropic thickener; a pH control; a surfactant; a flash corrosion inhibitor; a viscosity control; an alcohol; and a humectant. In certain embodiments, the thixotropic thickener ranges from about 0.1 to about 10 weight percent active ingredient of the masking composition; the pH control is sufficient to set the pH of the masking about pH7.5 to about pH 9.5; the surfactant comprises less than about 1 weight percent active ingredient of the masking composition; the flash corrosion inhibitor comprises from about 0 to about 0.2 weight percent active ingredient of the masking composition; the viscosity control comprises a salt ranging from about 0 to about 2 weight percent active ingredient of the masking composition; the alcohol, when present, comprises from about 0 to about 20 weight percent active ingredient of the masking composition; and the humectant comprises from about 0 to about 5 weight percent active ingredient of the masking composition. In various embodiments the thixotropic thickener is EP-1;

the pH control is sodium hydroxide; the surfactant is a nonanionic surfactant; the flash corrosion inhibitor is ammonium benzoate; the viscosity control agent is sodium sulfate; the alcohol is ethanol; and the humectant is polyethylene glycol. In various embodiments the thixotropic thickener ranges from about 1 to about 2 weight percent active ingredient of the masking composition; the pH control is sufficient to set the pH of the masking about pH 8.5 to about pH 9.5; the surfactant comprises less than about 0.5 weight percent active ingredient of the masking composition; the flash corrosion inhibitor comprises less than about 0.01 weight percent active ingredient of the masking composition; the viscosity control comprises less than about 0.15 weight percent active ingredient of the masking composition; the alcohol comprises less than about 0.4 weight percent active ingredient of the masking composition; and the humectant comprises less than about 0.15 weight percent active ingredient of the masking composition.

This invention also provides kits for temporarily protecting a surface. The kits typically comprise a container containing a masking material as described herein, and, optionally, instructional materials teaching the use of the masking composition for temporarily protecting a surface during an overcoating operation or during mechanical handling.

This invention also provides advertising materials comprising an audio or audiovisual presentation teaching the use of a container containing a masking material as described herein. In various embodiments where the audio or audiovisual presentation comprises a medium selected from the group consisting of an audio tape, a compact disk, a video tape, a DVD, a view master, a slide show, an mpeg file, and a powerpoint presentation.

In certain embodiments, this invention also provides an article of manufacture comprising one or more surfaces coated with a masking composition as described herein. In certain embodiments, the article of manufacture is an automobile or a component of an automobile.

DEFINITIONS

The term "aqueous solution" need not require the components comprising the solution actually be in solution phase (i.e. fully dissolved in water). The term "aqueous solution" thus includes aqueous mixtures, aqueous suspensions, aqueous dispersions, and the like.

The terms "masking material" and "masking composition" are used interchangeably to refer to a composition that can be applied to a surface to protect that surface from overcoating (e.g., with paint) and then subsequently removed from that surface (e.g., by washing/rinsing with water).

The term "thixotropic" as used herein refers to an decrease in apparent viscosity of a material as the shear rate of the material increases. Typical thixotropic materials experience a reduction in viscosity when shaken, stirred, or otherwise mechanically disturbed (i.e. brushing or rolling), but recover their original rheology in time, eventually reaching their original viscosity.

BRIEF DESCRIPTION OF THE DRAWINGS

FIG. 1 illustrates certain embodiments of the formulation of the present invention.

DETAILED DESCRIPTION

The present invention provides improved methods and compositions for protecting a s vehicle (e.g., motor vehicle) or other surface subject to a coating operation such as painting, or for protecting a surface of an article manufacture during an assembly operation. For example, in one embodiment, certain regions of an automobile, or other surface, may be masked using the coating compositions of the present invention to protect those regions from paint overspray in a painting booth. In another embodiment, an article of manufacture (e.g., an automobile panel) may be protected from mechanical impact and/or abrasion by the presence of such an overcoating.

In addition it is also often desired to protect the surfaces of the area in which an overcoating operation (e.g., painting) is performed. In particular, it is desired to protect the walls, floors and other surfaces of such an area (e.g., a painting booth) from paint overspray and spills. In addition, it is also desirable to reduce airborne dust in such areas during overcoating operations.

This invention provides compositions and methods to meet these needs. In preferred embodiments, the methods entail coating the surface to be protected (e.g., surface of a car or truck or the walls and/or floors of a spray booth) with a temporary protective coating composition as described herein. One or more coating (e.g., painting) operations, and/or mechanical/handling operations are performed and, when desired, the protective composition is removed (e.g., by a simple water wash).

The coating compositions of this invention, when applied to a surface (e.g., the surface of an automobile), typically produce a substantially continuous dry film that adheres well to the underlying surface. By "substantially continuous film" it is intended to mean herein a film generally lacking pinholes through which, oil, paint, dust, or other materials could reach the underlying surface. Further, the material can be removed easily from the surface to be protected after use with a water wash, or by mechanical means, or by combinations of these methods. In addition, because the material is biodegradable, it may be simply disposed of (e.g., washed down a sewer) with no substantial environmental impact.

It was surprising discovery that thickeners, more preferably thixotropic thickeners, can act as effective film formers and provide significant protection during a painting or other overcoating operation without the use of other film formers. Moreover, it was discovered that extremely thin films can be applied (e.g., ~0.06 mil) and still afford good protection to the underlying surface. Consequently material costs are reduced, and less effluent is produced in a given painting (overcoating) operation thereby reducing environmental impact.

When formulated as described herein, the thickener-based masking compositions provide effective protection of an underlying surface against paint spray, mechanical insult, and the like. It was a particularly surprising discovery of this invention that the coatings described herein, can be applied to a painted automobile surface, effectively protect the underlying surface during a commercial painting operation (e.g., spray painting, temperature cycling, etc.), and are easily washed off leaving the underlying surface in pristine condition.

A preferred method of protecting surfaces according to this invention includes steps of applying the coating compositions to the surface to be protected in a substantially continuous film. The compositions are then dried to form a coating that protects the underlying surface from the coating operation (e.g., paint overspray). The coating may be subsequently removed from the surface by simply washing with water when it is longer required. In a particularly preferred embodiment, the coatings of the present invention are used to protect components of motor vehicles (e.g., automobiles or automobile surface finishes), and the walls and floors of spray booths or other areas or structures that may be contacted with overspray in a coating (e.g., painting) operation.

While in certain embodiments, the coating composition is dried before applying an overcoating material (e.g., paint) to the surface, it was a surprising discovery that the coating composition can also prevent or greatly diminish overspray (e.g., paint overspray) from sticking to the surface while the coating composition is still wet. This permits if need be, the user to move forward in the painting process without waiting for the coating composition to dry. Previous technology has either not prevented overspray damage when wet, or the coating never became dry which resulted in a messy repair environment.

In certain preferred embodiments, the masking compositions comprise an aqueous solution of a thickener (e.g., a thixotropic thickener) and a pH control agent. The compositions can additionally include one or more additional components, including, but not limited to surfactant(s), alcohol(s), corrosion inhibitor(s), humectant(s), viscosity control(s), biocides, dyes/colorants, and the like, as described herein. Various components and ranges for illustrative formulations are shown in FIG. 1. Note these ranges and values are intended to be illustrative and not necessarily limiting.

The aqueous masking compositions are formulated by simple mixing of the various components. It is noted, that when a component is referred to as "X weight percent active ingredient of a masking composition" this is referred to as the weight percent of the active ingredient of the component in the "final" masking composition before drying. Thus, for example a commercial formulation of the thickener EP-1 consists of about 30 weight percent active ingredient. When the masking composition comprises 4 weight percent of this formulation, the final active ingredient weight percent is 1.2 weight percent (0.3×0.04=0.012).

I. Thickener.

It was a surprising discovery that thickeners, in particular thixotropic (shear-thinning) thickeners, can act as film formers and, when used as such, are capable of preventing penetration of a coating material (e.g., paint) to an underlying surface (e.g., the surface as a vehicle). In addition, it was also a surprising discovery that an extremely thin build of such thickeners (e.g. 0.06 mil) provide a masking film that offers highly effective protection to the underlying surface during coating operations (e.g., during painting operations).

Thixotropic thickeners are known to those of skill in the art. Such thickeners include, but are not limited to organowaxes (e.g., polylamide based organowaxes, castor oil derivatives, etc.), associative thickeners (e.g., hydrophobically modified anionic soluble emulsions (HASEs), hydrophobically modified ethylene oxyde urethane rheology modifiers (HEURs), hydrophobically modified polyethers, etc.), and the like. Thixotropic thickeners are commercially available (e.g. TIXOGEL®, Noveon (formerly B.F. Goodrich) EP-1, Albucril ESP, PURE THIX™ thickeners, VERTEC AT™ thickeners, SOLTHIX™ thickeners, and the like).

Suitable thickeners for use in the present invention include, but are not limited to neutralized cross-linked acrylate copolymers, neutralized cross-linked polyacrylic acids, neutralized polyacrylic acids, algins, carboxymethylcellulose, neutralized polymethacrylic acids, neutralized ethylene-acrylic acid copolymers, methocel, gum arabic, cellulose gum, neutralized styrene acrylic acid copolymers, and combinations thereof.

In certain preferred embodiments, the thickeners include Noveon EP-1, and/or B.F. Goodrich Albucril ESP.

The thickener typically comprises from about 0.5 to about 10 weight percent, preferably from about 1 to about 5 weight percent, more preferably from about 1 to about 3 weight percent, and in some embodiments about 1.2 weight percent active ingredient of the aqueous masking composition.

II. pH Control.

In certain embodiments, the masking compositions of this invention additionally, and optionally include a pH control. Suitable pH controls include essentially any material that can be used to adjust the pH of the masking composition without damaging the surface that the masking composition is applied to. The pH control can be provided as a buffer, and/or as a strong or weak acid, and/or as a strong or weak base.

In certain preferred embodiments the pH control is a basic pH control and is used to adjust the pH of the masking composition a range from about pH 7 to about pH 9.8, preferably from about pH 7.5 to about pH 9.5, more preferably from about pH 8 to about pH 9.

In certain embodiments, the pH control agent comprises one or more bases including, but not limited to, sodium hydroxide, potassium hydroxide, magnesium hydroxide, an amine, and sodium bicarbonate.

III. Surfactant.

To provide a continuous and level film, the masking composition preferably adequately wets the surface to be protected. However, many surfaces, in particular, car body finishes, are themselves highly hydrophobic or purposely treated (e.g., waxed) to have a low surface free energy so that water will bead.

In a number of embodiments, a surfactant is not required, particularly where the surface to be protected (covered) is clean/pristine. Where the underlying surface is less clean/pristine, however, effective masking can be facilitated by the incorporation of one or more surfactants into the masking composition.

Suitable surfactants include, but are not limited to anionic surfactants (e.g., alkyl sulfates (e.g., RHODAPON™), ether sulfates (e.g., RHODAPEX™), sulfonates (e.g., RHODACAL™), dodecylbenzene sulfonates, alpha-olefin sulfonates, diphenyl oxide disulfonates, phosphate esters (e.g., RHODAFAC™), carboxylates (e.g., Miranate™), etc.), cationic surfactants (e.g., imidazolines (e.g., MIRAMINE™), ethoxylated amines (e.g., RHODAMEEN™, etc.), non-ionic surfactants (e.g., nonylphenol ethoxylates (e.g., Igepal CO series), octylphenol ethoxylates (e.g., Igepal CA series), non-ionic esthers (e.g., Alkamuls™), oleyl alcohol ethoxylates (e.g., RHODASURF™), ethoxylated mercaptans (e.g., ALCODET™), capped ethoxylates (e.g., ANTAROX™), blocked polymers, etc.), and amphoteric surfactants (e.g., imidazoline derivatives (MIRANOL™), fatty amine derivatives (e.g., MIRATAINE™), etc.). In certain preferred embodiments, the masking composition includes nonionic alkyl aryl surfactants such as Triton CF-10 and CF-12 (Rohm & Haas, Philadelphia, Pa., U.S.A.). Also suitable is Triton X-100 and surfactants having fluorinated alkyl chains such as "Fluorad" products sold by Minnesota Mining and Manufacturing (St. Paul, Minn., U.S.A.) and "Zonyl" products sold by DuPont Company (Wilmington, Del., U.S.A.) are also suitable. In addition, many embodiments include polyethoxy adducts or modified (poly)ethoxylates such as Triton DF-12 and DF-16 sold by Union Carbide (Danbury, Conn., U.S.A.). Other surfactants include nonylphenoxypolyethanol (such as IGEPAL CO-660 made by GAF), polyoxyalkylene glycol (such as Macol 18 and 19 made by Mazer Chemicals), acetylenic diol-based surfactants (such as Surfynol 104A made by Air Products), and the like.

One role the surfactant in the masking composition is facilitate wetting of the substrate (the underlying surface) by the masking composition thereby leading to the formation of a continuous film. In certain embodiments, a sufficiently continuous protective film could be obtained with little or no surfactant so long as underlying surface is sufficiently clean and/or the masking composition contains a sufficient solids content (e.g., thickener) to produce a substantially continuous film. Films containing high solids concentrations are often highly viscous and therefore difficult to apply, especially by spraying. The use of surfactants or other wetting agents is preferred as coatings containing surfactants show superior film-forming properties in a variety of application methods even where solids content is quite low.

In certain embodiments, the wetting properties of the coating compositions may be improved by adding certain surfactant compositions, and/or by adding various water soluble alcohols such as propanol, methanol, or isopropyl alcohol, or by adding aliphatic polyols such as water soluble alcohols up to octanol. In particularly preferred embodiments, surfactants are used in the masking compositions of the present invention.

Certain preferred surfactants for use in the masking compositions of the present invention should reduce the surface tension of the masking composition to a sufficiently low value that a level film, free of pinholes, is laid down. In certain embodiments, the surfactant will reduce the surface tension of the masking composition to at most about 25 dynes per centimeter, and more preferably to at most about 20 dyne/cm. To avoid formation of pinholes, the surfactant should not foam.

In addition, surfactants are preferably selected that work with a variety of surfaces such as those containing silicones, acrylic waxes, Teflon® waxes, clear coats, natural and hydrocarbon waxes, etc. Still further preferred surfactants will be relatively inexpensive, will provide a product that does not spot, streak, or frame (i.e., evaporate faster at edges such as molding and/or trim) on the surface to be protected. Finally, the surfactant is preferably water soluble and otherwise compatible with the other components of the masking composition so that the composition does not separate and leave pinholes when dry.

Because many surfaces to be protected will have unusually low surface free energies, in many embodiments, surfactans are selected that are able to dramatically lower the surface and interfacial tensions of the masking composition. Compositions having very low surface tensions also tend to produce many fewer pinholes in the coating. Thus, any of the known classes of very low surface tension surfactants are preferred for use in certain embodiments of this invention.

One such class is the alkoxylates of fluorinated alkyl chains. Other functional derivatives (e.g., esters, sulfonates, carboxylates, ammonium compounds, etc.) of fluorinated alkyl chains also tend to produce low surface tension aqueous solutions. In general, replacement of hydrogens on an alkyl group by fluorine atoms leads to surfactants of unusually low surface tension. The above mentioned "Fluorads" and "Zonyls" are examples of surfactants having fluorinated alkyl chains.

Various embodiments, contemplate the use of combined surfactants. For example, in certain embodiments, fluorinated surfactants can be combined with sulfonated surfactants or various non-ionic surfactants.

It has been discovered that a in certain particularly preferred embodiments the surfactants include one or more non-ionic surfactants. Certain preferred surfactants include alcohol ethoxylates (e.g., TOMADOL™ 91-6. On preferred surfactant includes TOMADOL™ 91-6 and Triton™ DF-16.

The surfactant is typically present in an amount effective to produce a coating that lays out smoothly in a substantially continuous film of the painted surface of an automobile. In certain embodiments, preferred masking compositions include up to 5 percent surfactant, preferably up to about 3 percent surfactant, still more preferably up to about 1 percent surfactant and most preferably up to about 0.5 or 0.3 percent surfactant.

IV. Alcohol.

In certain embodiments, the masking compositions of this invention optionally include a water soluble alcohol. The alcohol can act as a drying agent to speed drying of the film, as a wetting agent, and as a biocide/preservative.

Suitable alcohols include, but are not limited to various straight chain alcohols (e.g., propanol, methanol, ethanol, etc.) and/or various aliphatic polyols such as water soluble alcohols up to octanol. The alcohol(s), when present, are typically present in a range from about 0 weight percent to about 20 weight percent, preferably from about 0.1 weight percent to about 10 weight percent, more preferably from about 0.2 weight percent to about 5 weight percent, and most preferably from about 3 to about 4 weight percent active ingredient of the masking composition.

V. Preservative/Biocide.

The constituents of the coating compositions of this invention can, in certain instances, support the growth of microorganisms such as microbes, fungi, and the like. Thus, in certain embodiments, to increase storage life, it is desired to include a preservative. The term "preservative", as used herein, is intended to designate a substance showing antimicrobial properties, in particular bactericidal properties and preferably also antifungal properties. Preservatives are well known to those of skill in the art and include, but are not limited to anti-bacterial agents, anti-fungal agents, bacteriostatic agents, fungistatic agents, and enzyme inhibitors. Suitable preservatives include, but are not limited to benzoic acid, sorbic acid or the salts thereof, thimerosal (or merthiolate), phenyl mercuric acetate, phenyl mercuric nitrate, detergents (e.g., benzalkonium chloride), and sodium azide. Preferred preservatives are relatively or completely non-toxic to higher animals (e.g., mammals) and, thus, preservatives commonly used in foodstuffs and medical products are suitable. Such preservatives include, but are not limited to ethyl alcohol, chlorhexidine gluconate, sorbic and benzoic acid and their salts, and the like. Other preferred preservatives include Kathon LX (Rohm Haas, Inc.) and BTC 2125 (Stephan Chemical Co., Inc.).

The preservatives, when present, typically range from about 0 weight percent up to about 0.2 weight percent, preferably from about 0.01 weight percent, up to about 0.005 weight percent.

VI. Viscosity Control.

The masking compositions of this invention can optionally include one or more viscosity control agents. The viscosity control agents are typically selected to adjust the viscosity for a particular application methods (e.g., brushing, doctor bar, spraying, etc.). Viscosity control agents are well known to those of skill in the art.

In certain embodiments, salts provide effective viscosity control agents and can effectively be used to "thin" the thixotropic thickeners used in the compositions of this invention.

Suitable salts include, but are not limited to, sulfates (e.g., sodium sulfate, potassium sulfate, etc.), chlorides (e.g., sodium chloride, potassium chloride), bromides (e.g., sodium bromide, potassium bromide), and the like. In certain embodiments, the salt is sodium sulfate.

When present the salt typically ranges from about 0 to about 2 weight percent, preferably from about 0.1 to about 1 weight percent, and more preferably from about 0.1 to about 0.5 weight percent active ingredient of the masking composition.

VII. Flash Corrosion Inhibitor.

The masking compositions of this invention can optionally include one or more "flash corrosion inhibitors" ("flash rust inhibitors"). Flash corrosion inhibitors compatible with aqueous systems are well known to those of skill in the art. Such inhibitors include, but are not limited to ammonium benzoate, ADD APT® Ferrocor flash corrosion inhibitor, M-435, M-240, alkyl alkanolamines (e.g., MORLEX™), and the like. IN certain embodiments, the flash corrosion inhibitor comprises ammonium benzoate.

When present, the flash corrosion inhibitor typically ranges from about 0 to about 0.5 weight percent, preferably from about 0.1 weight percent to about 0.2 weight percent active ingredient in the masking composition.

VIII. Humectant.

The masking compositions of this invention can optionally include one or humectants. Humectants are well known to those of skill in the art. Certain preferred humectants include glycols (e.g., polyethylene glycol 400), and the like.

Certain other humectants provide more environmentally friendly alternatives to traditional humectants. Thus, for example, humectant GRB2 is an 80% aqueous solution of a non-ionic dispersant mixed with low molecular weight polyols, which is supplied as a straw colored liquid and contains minimal VOCs.

When present, a humectant ranges from about 0 weight percent to about 5 weight percent, preferably from about 0.01 weight percent to about 1 or 2 weight percent, more preferably from about 0.1 weight percent to about 0.5 weight percent active ingredient in the masking composition.

IX. Dye/Coloring Agent.

The composition can additionally include dyes or color agents, scents, and the like. In certain embodiments that dyes range from about 0 weight percent up to about 0.05 weight percent, preferably from about 0.01 0.02 weight percent active ingredient in the masking composition.

X. Sugar.

In various embodiments, the masking composition can additionally include one or more sugars. It has been observed that the sugar is beneficial in helping the coating to more completely release from the underlying surface (prevent crosslinking). Suitable sugars include, but are not limited to sucrose, glucose, fructose, corn syrup, sorbitol, glycerin, and the like. In certain embodiments, glucose (as opposed to say sorbitol) is used because can be less "sticky" and therefore more useful in a coating that gets touched.

EXAMPLES

The following examples are offered to illustrate, but not to limit the claimed invention.

Example 1

To produce various surface protective coatings, of this invention, components (as shown in Table 1) were combined at room temperature and at atmospheric pressure by slow stirring to form the various surface protective coating compositions shown in Table 1. The homogeneous coating compositions were then adjusted to 8.5-9.5 by the addition of sodium hydroxide.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. A method of temporarily protecting a surface in a coating operation, said method comprising:

a) applying a masking material to said surface, said applying resulting in a substantially continuous film of said masking material, said masking material, before drying, comprising an aqueous solution of:

i) a thixotropic thickener present in an amount ranging from about 0.15 to about 5 weight percent active ingredient wherein said thixotropic thickener comprises an agent selected from the group consisting of a crosslinked acrylate copolymer, a crosslinked polyacrylic acid, a polymethacrylic acid, and an ethylene-acrylic acid copolymer; and ii) a pH control to adjust pH of said masking material from about pH 7.5 to about pH 9.5, wherein said masking material does not contain additional film formers;

b) coating all or a portion of said surface with an overcoating compound, said masking material preventing said coating compound from contacting said surface; and c) removing said masking material from said surface whereby the coating compound applied to the surface covered with the masking material is removed together with the masking material.

2. The method of claim 1, wherein said overcoating compound is paint.

3. The method of claim 1, wherein said surface comprises a painted surface of an automobile.

4. The method of claim 1, wherein said surface comprises a bumper or trim of a vehicle.

TABLE 1

One illustrative formulation of the masking composition.

| Component | Typical Commercial Form | % Active Ingredient In Unit (% A.I.) | % Component in Masking Material | % Active Ingredient in Masking Material | Min | Max |
|---|---|---|---|---|---|---|
| Thickener/ Film Former | Carbopol EP-1 Noveon | 30 | 4.000 | 1.200 | 0.5 | 10 |
| Humectant | Polyethylene Glycol 400 | 100 | 0.100 | 0.100 | 0 | 5 |
| Flash Corrosion Inhibitor | Ammonium Benzoate | 100 | 0.010 | 0.010 | 0 | 0.5 |
| Viscosity Control | Sodium Sulfate | 100 | 0.100 | 0.100 | 0 | 2 |
| pH control | Sodium Hydroxide | 100 | 0.175 | 0.175 | 0.02 | 0.5 |
| Surfactant Primary | Tomadol 91-6 Tomah | 100 | 0.250 | 0.250 | 0 | 5 |
| Surfactant Secondary | Triton DF-16 Union Carbide | 100 | 0.025 | 0.025 | 0 | 5 |
| Biocide | Kathon LX 14 Rohm & Haas | 14 | 0.01 | 0.0014 | 0 | 0.01 |
| Dye/Coloring | Uranine Abbey | 75 | 0.010 | 0.0075 | 0 | 0.02 |
| Water. | Deionized | 100 | Remainder | Remainder | Remainder | Remainder |

5. The method of claim 1, wherein said thixotropic thickener comprises an acrylic acid polymer.

6. The method of claim 1, wherein said masking material further comprises a surfactant present in an amount effective to produce a coating that lays out smoothly in a substantially continuous film of the painted surface of an automobile.

7. The method of claim 6, wherein said surfactant comprises a non-ionic surfactant.

8. The method of claim 1, wherein said masking material further comprises a viscosity control.

9. The method of claim 8, wherein said viscosity control is a salt.

10. The method of claim 8, wherein said viscosity control comprises sodium sulfate.

11. The method of claim 8, wherein said viscosity control ranges up to about 2.0 weight percent active ingredient of said masking material.

12. The method of claim 1, wherein said masking material further comprises an alcohol.

13. The method of claim 12, wherein said alcohol is a straight chain alcohol.

14. The method of claim 1, wherein said masking material further comprises a biocide.

15. The method of claim 14, wherein said biocide ranges from about 0.005 to about 0.01 weight percent active ingredient of said masking material.

16. The method of claim 1, wherein said masking material further comprises a humectant.

17. The method of claim 16, wherein said humectant ranges from about 0.1 weight percent to about 0.5 weight percent active ingredient of said masking material.

18. The method of claim 1, wherein said masking material further comprises a flash corrosion inhibitor.

19. The method of claim 18, wherein said flash corrosion inhibitor comprises about 0.01 weight percent active ingredient of said masking material.

20. The method of claim 1, wherein said masking material further comprises:

a surfactant;

a flash corrosion inhibitor;

a viscosity control;

an alcohol; and a humectant.

21. The method of claim 20, wherein:

said thixotropic thickener ranges from about 0.1 to about 10 weight percent active ingredient of said masking material;

said pH control is sufficient to set the pH of said masking from about pH7.5 to about pH 9.5;

said surfactant comprises less than about 1 weight percent active ingredient of said masking material;

said flash corrosion inhibitor comprises 0.01 weight percent active ingredient of said masking material;

said viscosity control comprises a salt ranging from about 0.1 to about 1 weight percent active ingredient of said masking material;

said alcohol comprises from about 0.1 to about 10 weight percent active ingredient of said masking material; and said humectant comprises from about 0.1 to about 1 weight percent active ingredient of said masking material.

22. The method of claim 21, wherein:

said pH control is sodium hydroxide;

said surfactant is a nonionic surfactant;

said flash corrosion inhibitor is ammonium benzoate;

said viscosity control agent is sodium sulfate;

said alcohol is ethanol;

said humectant is polyethylene glycol.

23. The method of claim 22, wherein:

said thixotropic thickener ranges from about 1 to about 2 weight percent active ingredient of said masking material;

said pH control is sufficient to set the pH of said masking about pH 8.5 to about pH 9.5;

said surfactant comprises less than about 0.5 weight percent active ingredient of said masking material;

said flash corrosion inhibitor comprises less than about 0.01 weight percent active ingredient of said masking material;

said viscosity control comprises less than about 0.15 weight percent active ingredient of said masking material;

said alcohol comprises less than about 0.4 weight percent active ingredient of said masking material; and said humectant comprises less than about 0.15 weight percent active ingredient of said masking material.

24. A masking composition for the temporary protection of a surface during a coating procedure, said masking composition comprising an aqueous solution of:

i) a thixotropic thickener present in an amount ranging from about 0.15 to about 5 weight percent active ingredient of said masking composition, wherein said thixotropic thickener comprises an agent selected from the group consisting of a crosslinked acrylate copolymer, a crosslinked polyacrylic acid, a polymethacrylic acid, and an ethylene-acrylic acid copolymer; and ii) a pH control to adjust pH of said masking composition from about pH 7.5 to about pH 9.5, wherein said masking composition does not contain additional film formers.

25. The composition of claim 24, wherein said pH control comprises a base.

26. The composition of claim 24, wherein said masking composition further comprises a surfactant present in an amount effective to produce a coating that lays out smoothly in a substantially continuous film of the painted surface of an automobile.

27. The composition of claim 26, wherein, wherein said surfactant comprises a non-ionic surfactant.

28. The composition of claim 24, wherein said masking composition further comprises a viscosity control.

29. The composition of claim 28, wherein said viscosity control is a salt.

30. The composition of claim 24, wherein said masking composition further comprises an alcohol.

31. The composition of claim 24, wherein said masking composition further comprises a biocide.

32. The composition of claim 24, wherein said masking composition further comprises a humectant.

33. The composition of claim 24, wherein said masking composition further comprises a flash corrosion inhibitor.

34. The composition of claim 24, wherein said masking material further comprises:

a surfactant;

a flash corrosion inhibitor;

a viscosity control;

an alcohol; and a humectant.

35. The composition of claim 34, wherein:

said thixotropic thickener ranges from about 0.1 to about 10 weight percent active ingredient of said masking composition;

said pH control is sufficient to set the pH of said masking about pH7.5 to about pH 9.5;

said surfactant comprises less than about 1 weight percent active ingredient of said masking composition;

said flash corrosion inhibitor comprises from about 0.01 weight percent active ingredient of said masking composition;

said viscosity control comprises a salt ranging from about 0.1 to about 1 weight percent active ingredient of said masking composition;

said alcohol comprises from about 0.1 to about 10 weight percent active ingredient of said masking composition; and said humectant comprises from about 0.1 to about 1 weight percent active ingredient of said masking composition.

36. The composition of claim 35, wherein:

said thixotropic thickener is an acrylic acid polymer or copolymer;

said pH control is sodium hydroxide;

said surfactant is a nonionic surfactant;

said flash corrosion inhibitor is ammonium benzoate;

said viscosity control agent is sodium sulfate;

said alcohol is ethanol; and said humectant is polyethylene glycol.

37. The composition of claim 36, wherein:

said thixotropic thickener ranges from about 1 to about 2 weight percent active ingredient of said masking composition;

said pH control is sufficient to set the pH of said masking about pH 8.5 to about pH 9.5;

said surfactant comprises less than about 0.5 weight percent active ingredient of said masking composition;

said flash corrosion inhibitor comprises less than about 0.01 weight percent active ingredient of said masking composition;

said viscosity control comprises less than about 0.15 weight percent active ingredient of said masking composition;

said alcohol comprises less than about 0.4 weight percent active ingredient of said masking composition; and said humectant comprises less than about 0.15 weight percent active ingredient of said masking composition.

38. A kit for temporarily protecting a surface, said kit comprising:

a container containing a masking material according to claim 24; and instructional materials teaching the use of said masking composition for temporarily protecting a surface during an overcoating operation or during mechanical handling.

* * * * *